United States Patent
Line et al.

(10) Patent No.: US 9,694,779 B1
(45) Date of Patent: Jul. 4, 2017

(54) SEATBACK WITH SIDE AIRBAG ENERGY MANAGEMENT SYSTEM

(71) Applicant: Ford Global Technologies, LLC, Dearborn, MI (US)

(72) Inventors: Johnathan Andrew Line, Northville, MI (US); Martin Voelker, Walled Lake, MI (US); Richard Joseph Soyka, Jr., Shelby Township, MI (US); Manoj Desai, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/257,980

(22) Filed: Sep. 7, 2016

(51) Int. Cl.
| | |
|---|---|
| *B60R 21/207* | (2006.01) |
| *B60R 21/216* | (2011.01) |
| *B60R 21/2155* | (2011.01) |
| *B60R 21/215* | (2011.01) |

(52) U.S. Cl.
CPC .......... *B60R 21/216* (2013.01); *B60R 21/207* (2013.01); *B60R 21/2155* (2013.01); *B60R 2021/2163* (2013.01); *B60R 2021/21531* (2013.01); *B60R 2021/21537* (2013.01)

(58) Field of Classification Search
CPC . B60R 21/207; B60R 21/216; B60R 21/2155; B60R 2021/21531; B60R 2021/21537; B60R 2021/2163
See application file for complete search history.

(56) References Cited

U.S. PATENT DOCUMENTS

| | | | |
|---|---|---|---|
| 6,045,151 | A | 4/2000 | Wu |
| 7,261,316 | B1 | 8/2007 | Salmo et al. |
| 8,398,114 | B2 | 3/2013 | Laframboise et al. |
| 8,672,352 | B2 | 3/2014 | Tracht et al. |
| 8,807,592 | B2 * | 8/2014 | Bieck .................... B60R 21/215 280/728.3 |
| 2010/0295282 | A1 | 11/2010 | Kim et al. |

FOREIGN PATENT DOCUMENTS

JP          10035335 A  *  2/1998  ........... B29C 59/007

* cited by examiner

*Primary Examiner* — Faye M Fleming
(74) *Attorney, Agent, or Firm* — Vichit Chea; Price Heneveld LLP (57) ABSTRACT

A seatback assembly includes a seatback frame with an airbag deployment system coupled to a side member thereof. The airbag deployment system includes an airbag configured to deploy outwardly at a deployment force. A back panel includes a side member that at least partially covers the airbag deployment system in assembly. The side member includes a notch disposed adjacent to the airbag deployment system which separates a rear portion of the back panel from an airbag door configured to outwardly flex to an open position under the deployment force of the airbag deployment system. An adhesive patch is partially disposed over the notch and includes an adhesive layer adhered to the rear portion of the back panel and the airbag door of the back panel to tether the airbag door to the back panel and control the opening of the airbag door under the deployment force of the airbag.

20 Claims, 7 Drawing Sheets

SEATBACK WITH SIDE AIRBAG ENERGY MANAGEMENT SYSTEM

FIELD OF THE INVENTION

The present invention generally relates to a vehicle seating assembly, and more particularly, an attachment architecture and energy transfer design for controlling side airbag deployment at the seatback of the vehicle seating assembly.

BACKGROUND OF THE INVENTION

Vehicle seat assemblies are currently provided having integrated safety features for the protection of the vehicle occupant. Vehicle seat assemblies must be constructed in such a way that the vehicle seat is structurally sound and provides the support necessary for a vehicle occupant. In order to improve the safety features of a vehicle seat, an airbag deployment device may be incorporated into the vehicle seat design. When an airbag deployment device is integrated into the vehicle seat design, the assembly of the vehicle seat must accommodate proper deployment of the airbag deployment device. Thus, it is desirable to provide a seat assembly that can be assembled in an efficient manner while providing coupling features that are configured to allow for proper deployment of an airbag deployment device and effectively absorb energy associated with an airbag deployment.

SUMMARY OF THE INVENTION

According to one aspect of the present invention, a seatback assembly includes a back panel having a first side member with an elongate notch disposed thereon. An airbag door operable between open and closed positions is defined between the notch and a front portion of the first side member of the back panel. A seatback frame is coupled to the back panel and includes an airbag deployment system coupled thereto. The airbag deployment system is configured to deploy an airbag in an outward direction towards the first side member of the back panel to move the airbag door from the closed position to the open position under a deployment force applied by the airbag. An adhesive patch is adhered to an inner surface of the first side member of the back panel and substantially covers the notch.

According to another aspect of the present invention, a seatback assembly includes a seatback frame having an airbag mounted thereto. A back panel partially covers the seatback frame and includes a notch separating a rear portion of the back panel from an airbag door. The airbag door is configured to outwardly flex to an open position under an airbag deployment force. An adhesive patch is disposed over a portion of the notch and is adhered to both the rear portion of the back panel and the airbag door of the back panel.

According to yet another aspect of the present invention, a vehicle seating assembly includes a seatback assembly having a seatback frame with an airbag deployment system coupled to a side member thereof. The airbag deployment system includes an airbag configured to deploy outwardly at a deployment force. A back panel includes a side member that at least partially covers the airbag deployment system in assembly. The side member includes a notch disposed adjacent to the airbag deployment system which separates a rear portion of the back panel from an airbag door configured to outwardly flex to an open position under the deployment force of the airbag deployment system. An adhesive patch is partially disposed over the notch and includes an adhesive layer adhered to the rear portion of the back panel and the airbag door of the back panel.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Reference will now be made in detail to the present embodiments, examples of which are illustrated in the accompanying drawings. Whenever possible, the same reference numerals will be used throughout the drawings to refer to the same or like parts.

Figures 1, 2:
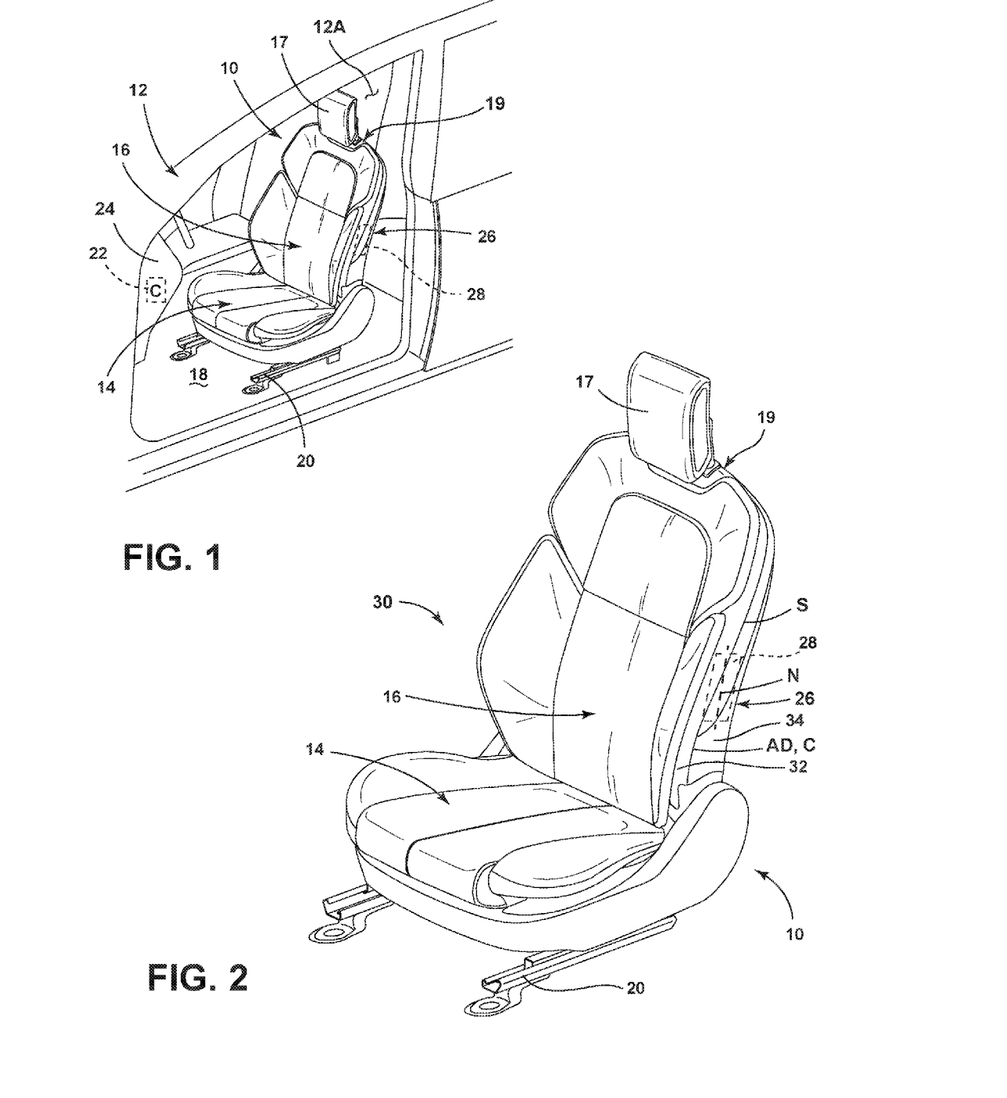
FIG. 1 is a top perspective view of a seating assembly within a vehicle.
FIG. 2 is a top perspective view of the vehicle seat of FIG. 1 as removed from the vehicle.

For purposes of description herein, the terms "upper," "lower," "right," "left," "rear," "front," "vertical," "horizontal," and derivatives thereof, shall relate to the disclosure as oriented in FIG. 1, unless stated otherwise. However, it is to be understood that the disclosure may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting unless the claims expressly state otherwise. Additionally, embodiments depicted in the figures may not be to scale or may incorporate features of more than one embodiment.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Referring now to FIG. 1, a vehicle seating assembly 10 is shown positioned in a driver's side location of a vehicle interior 12A of a vehicle 12. The vehicle seating assembly 10 includes a seat portion 14 and a seatback assembly 16. The seatback assembly 16 is contemplated to be pivotally adjustable between upright and reclined positions relative to the seat portion 14. The seatback assembly 16 supports a headrest assembly 17 at an upper portion 19 thereof. In FIG. 1, the seat portion 14 is shown slidably coupled with a floor 18 of the vehicle 12 on a track assembly 20. The track assembly 20 is configured to allow the vehicle seating assembly 10 to adjust in forward and rearward directions within the vehicle interior 12A. It is understood that the vehicle seating assembly 10 may be positioned within the vehicle interior 12A at various locations other than the illustrated location, such as a passenger side location, a mid-row location, or a rear seat location. It is also contemplated that the vehicle seating assembly 10 may not include a seatback reclining feature and also may not include a track assembly. Thus, the vehicle seating assembly 10 may be fixedly coupled with the floor 18 of the vehicle 12.

With further reference to FIG. 1, a controller 22 is disposed in an instrument panel or dashboard 24 on the vehicle 12. The controller 22 is electronically coupled with an airbag deployment system 26 disposed within the seatback 16 of the vehicle seating assembly 10. The controller 22 is configured to detect a condition trigger, such as an impact event, and further configured to send a deployment signal to the airbag deployment system 26 for deploying an airbag 28 through a side of the seatback assembly 16. The deployment signal from the controller 22 to the airbag deployment system 26 is configured to cause the airbag 28 to inflate to a deployed position D shown in FIGS. 3 and 4. The airbag deployment system 26 is disposed on an outboard side of a support structure of the seatback assembly 16, as further described below. The outboard connotation, for purposes of this disclosure, refers to a lateral side most proximate a side door or a outside interior region of the vehicle 12. In turn, an inboard connotation, for purposes of this disclosure, refers to an area most proximate to a central interior region of the vehicle 12.

Figures 3, 4:
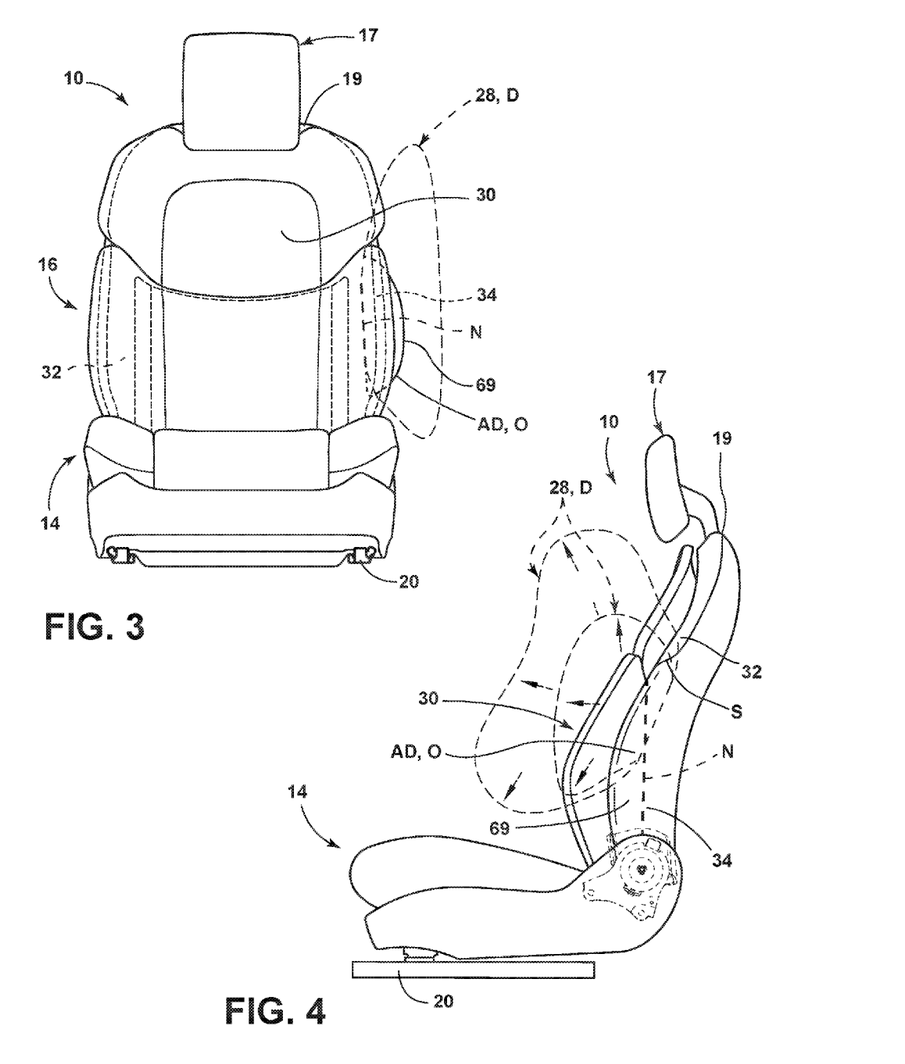
FIG. 3 is a front elevational view of one embodiment of a seating assembly, showing an airbag deployed in dashed lines.
FIG. 4 is side elevational view of one embodiment of the seating assembly of FIG. 3.

Referring now to FIG. 2, the seatback assembly 16 includes a front cushion assembly 30 which is supported on and coupled to a seatback carrier 32. The seatback carrier 32 is coupled to a back panel 34. In assembly, the seatback carrier 32 and back panel 34 are coupled together around a seatback frame, as further described below with specific reference to FIG. 3. The airbag deployment system 26, and the airbag 28 thereof, are shown in phantom in FIG. 2 disposed on an internal frame member of the vehicle seating assembly 10. An outer seam S is disposed along the coupling of the seatback carrier 32 to the back panel 34. A notch N is shown disposed along the back panel 34. The notch N is disposed along an inner surface of the back panel 34 and is configured to provide a hinged feature for an airbag door AD (FIG. 4) along an outboard side of the back panel 34 to allow for the airbag 28 to deploy therethrough. The airbag door AD opens at the notch N under the outward force of the airbag 28 during initial deployment of the airbag 28. As best shown in FIG. 4, the airbag door AD is defined from the notch N to a front portion 69 of the back panel 34. The airbag door AD is operable between a closed position C (FIG. 2) and an open position O (FIGS. 3 and 4).

Figure 5:
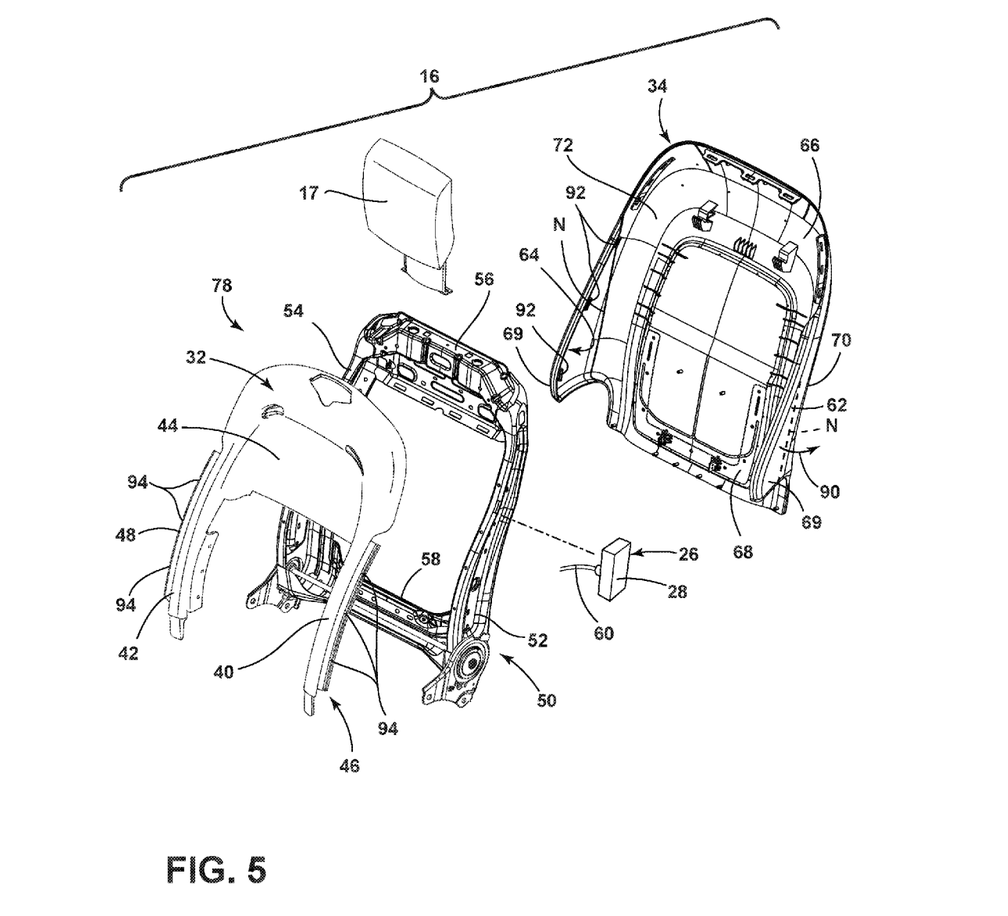
FIG. 5 is an exploded top perspective view of one embodiment of a seatback.

Referring now to FIG. 5, the seatback carrier 32 is shown having a first side member 40 and a second side member 42 which are substantially upright members interconnected at upper portions thereof by a cross member 44. The first and second side members 40, 42 include attachment flanges 46, 48 having clips mounting features 94 which are used to releasably couple the seatback carrier 32 to the back panel 34 at clips 92 disposed around a periphery of the back panel 34. The interconnection between the seatback carrier 32 and the back panel 34 retains the airbag door AD in the closed position C as further described below. The attachment flanges 46, 48 may also be used to attach the front cushion assembly 30 (FIG. 2) to the seatback carrier 32 as well as couple the seatback carrier 32 to a seatback frame 50. The seatback frame 50 includes first and second side members 52, 54 which are interconnected at an upper cross member 56 and a lower cross member 58. The seatback frame 50 is contemplated to be comprised of a stamped metal material that is formed from multiple parts that may be welded or otherwise coupled together. In assembly, the seatback frame 50 provides the structural rigidity necessary to support a vehicle occupant at the seatback 16 of the vehicle seat assembly 10 shown in FIGS. 1 and 2. The seatback frame 50 is also configured to support the headrest assembly 17 from the upper cross member 56 thereof. As further shown in FIG. 5, the airbag deployment system 26 is configured to couple to the side member 52 of the seatback frame member 50. A lead 60 is shown extending from the airbag deployment system 26 and is configured to electronically couple to the controller 22 shown in FIG. 1.

With further reference to FIG. 5, the back panel 34 of the seatback 16 is shown having first and second side members 62, 64 which are spaced-apart from one another and interconnected by an upper cross member 66 and a lower cross member 68. The back panel 34 includes an outer surface 70 or an A-side surface that is visible to the end user in the assembled vehicle seating assembly 10 shown in FIGS. 1 and 2. The back panel 34 further includes an inner surface or B-side surface 72 that is concealed to the end user in final assembly. The back panel 34 is contemplated to be a polymeric member formed from an injection molding process, or other similar forming process. As a polymeric member, the back panel 34 is flexible at lower ends of the first and second side members 62, 64, as further described below. The notch N is shown disposed along the inner surface 72 and is a substantially upright elongate notch defining a portion of thinned material 95 (FIGS. 7A and 7B) that can be compromised or outwardly flexed under the outwardly directed deployment force DF (FIGS. 7A and 7B) of the airbag 28 from the airbag deployment system 26. In the embodiment shown in FIG. 5, first and second notches N are shown disposed along the first and second side members 62, 64. Thus, it is contemplated that the seatback 16 of the present concept can be used for a configuration requiring a side deployment airbag on either a right side or a left side of the seatback 16.

In assembly, the seatback frame 50 is partially covered by the seatback carrier 32 and partially covered by the back panel 34. Specifically, the seatback frame 50 is coupled to and disposed between the seatback carrier 32 and the back panel 34 when the seatback carrier 32 and back panel 34 are coupled to one another.

Figure 6A:
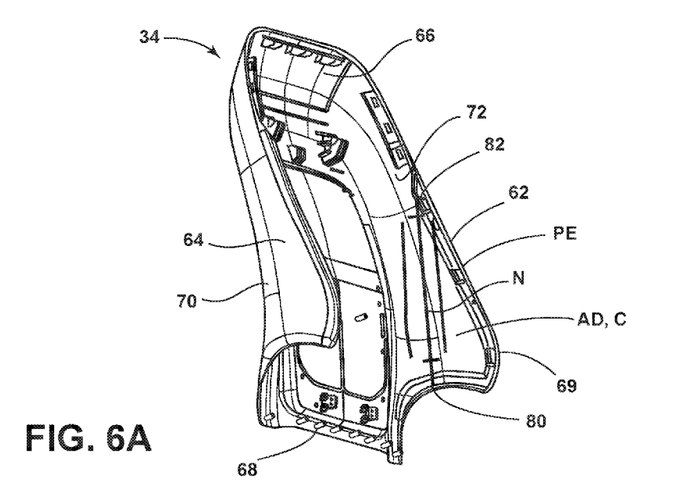
FIG. 6A is a bottom perspective view of a back panel of a seatback.

Referring now to FIG. 6A, the back panel 34 is shown having the notch N disposed on the first side member 62 thereof. The notch N is shown extending from a lower end 80 to an upper end 82 thereof along the inner surface 72 of the first side member 62. The airbag door AD is defined from the notch N to the front portion 69 of the back panel 34 and is shown in the closed position C. The upper and lower ends 82, 80 of the notch N are disposed on a peripheral edge PE of the first side member 62 of the back panel 34.

Figure 6B:
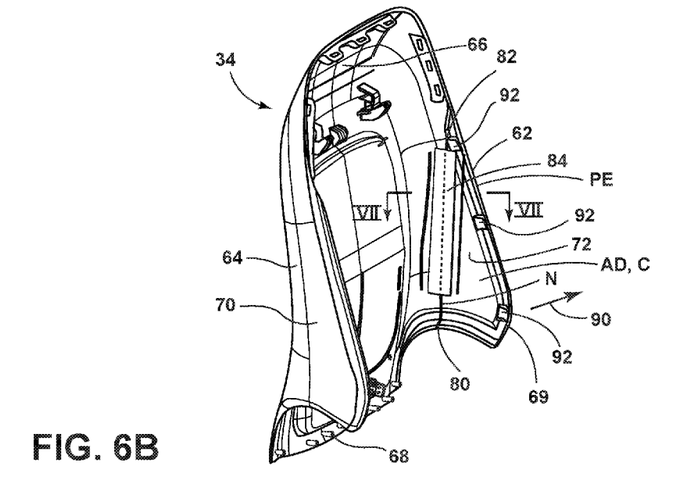
FIG. 6B is a bottom perspective view of the back panel of FIG. 6A having an adhesive patch applied to an inner surface thereof.

Referring now to FIG. 6B, an adhesive patch 84 is shown disposed along the notch N between the lower end 80 and the upper end 82 thereof. The adhesive patch 84 includes an adhesive layer 86 (FIGS. 7A, 7B) disposed in an abutting and adhered relationship with the inner surface 72 of the first side member 62. In assembly, the adhesive patch 84 is configured to provide a tethering feature for a front portion 69 of the first side member 62 that may break off from the back panel 34 during an airbag deployment. Further, the adhesive patch 84 is configured to manage and dissipate the energy that results from a side airbag deployment, which is particularly relevant in cold weather deployment conditions when the polymeric back panel 34 is generally more brittle as compared to warm weather conditions. The adhesive patch 84 is contemplated to be approximately 232 mm long between upper and lower ends 85, 83 thereof. The adhesive patch 84 is also contemplated to be approximately 32 mm wide. Thus, the adhesive patch 84 is contemplated to be an elongate adhesive patch 84 that substantially covers the notch N as adhered to the back panel 34. The adhesive patch 84 is contemplated to be adhered to the inner surface 72 of the first side member 62 with a lower end 83 of the adhesive patch 84 disposed approximately 40-45 mm above the lower end 80 of the notch N and the peripheral edge PE of the back panel 34. In this way, the adhesive patch 84 can work in harmony with the timing of the airbag deployment to ensure that energy management provided by the adhesive patch 84 occurs at the right time during airbag deployment. In this way, optimized deployment through the first side member 62 is assured.

Figure 6C:
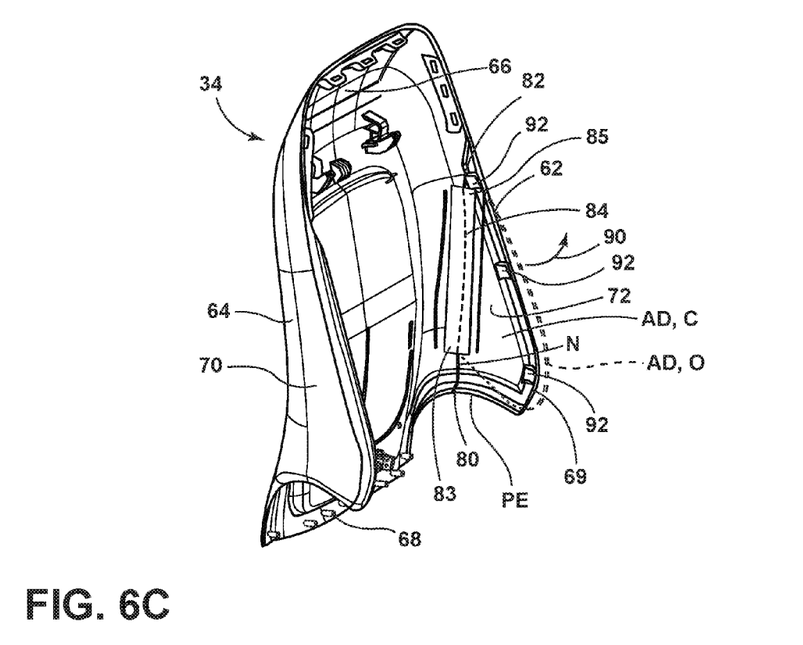
FIG. 6C is a bottom perspective view of the back panel of FIG. 6B having an airbag door shown in phantom in an open position.

Referring now to FIG. 6C, the back panel 34 is shown having the airbag door AD in the open position O, wherein the airbag door AD is flexed outwardly in the direction as indicated by arrow 90. This flexed movement of the airbag door AD pivots at the notch N of the first side member 62 and allows for the airbag 28 to deploy therethrough as shown in FIG. 7B.

Figure 7A:
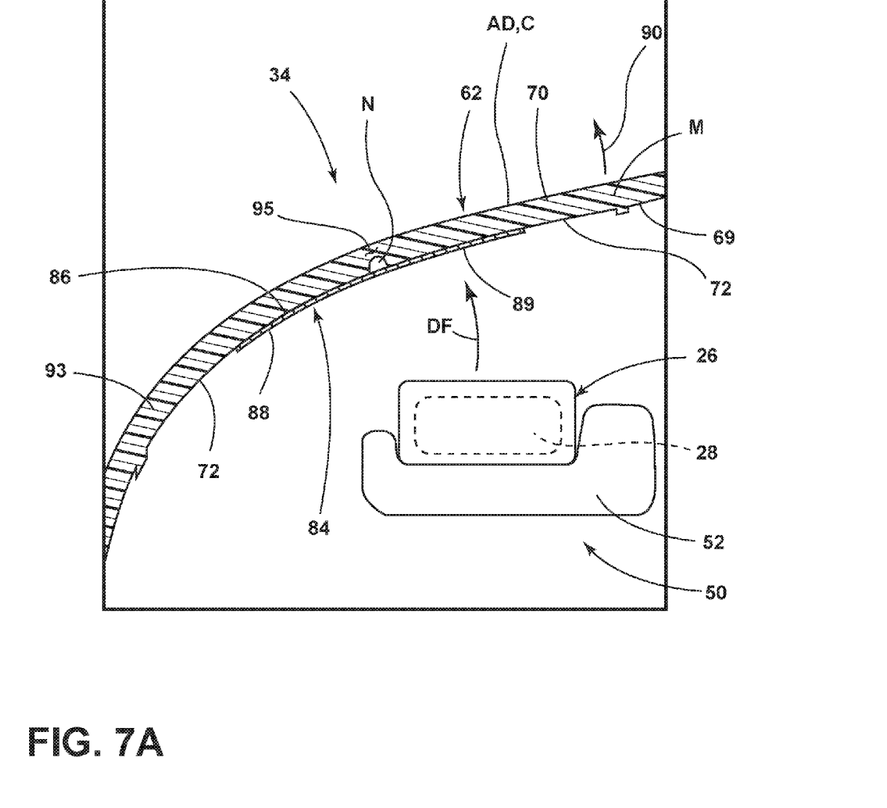
FIG. 7A is a cross-sectional view of the pack panel of FIG. 6B taken at line VII.

Referring now to FIG. 7A, the back panel 34 is shown in a cross-sectional view thereof with the adhesive patch 84 applied over the notch N disposed in a body portion M of the back panel 34. Specifically, the side member 62 of the back panel 34 includes a body portion M disposed between outer surface 70 and inner surface 72. As shown in FIG. 7, the notch N defines a channel or recess disposed along the body portion M to provide a breakable or living hinge feature for the side member 62 of the back panel 34 at a thinned portion or strip 95 of the body portion M disposed adjacent and outwardly to the notch N. In this way, the notch N allows the airbag door AD of the back panel 34 to move or outwardly flex in the direction as indicated by arrow 90 by hinging or pivoting at the notch N to provide an opening through which the airbag 28 can deploy. The thinned portion 95 of the body portion M of the first side member 62 of the back panel 34 defines an elongate linear hinge for the airbag door AD. The airbag deployment system 26 is shown coupled to a side member 52 of the seatback frame 50. The airbag deployment system 26 is configured to deploy the airbag 28 in an outward direction under a deployment force DF towards the inner surface 72 of the first side member 62 of the back panel 34. Contact from the airbag 28 under the outward deployment force DF will move the airbag door AD from the closed position C to the open position O under a deployment force applied by the airbag 28 as shown in FIG. 7B.

Figure 7B:
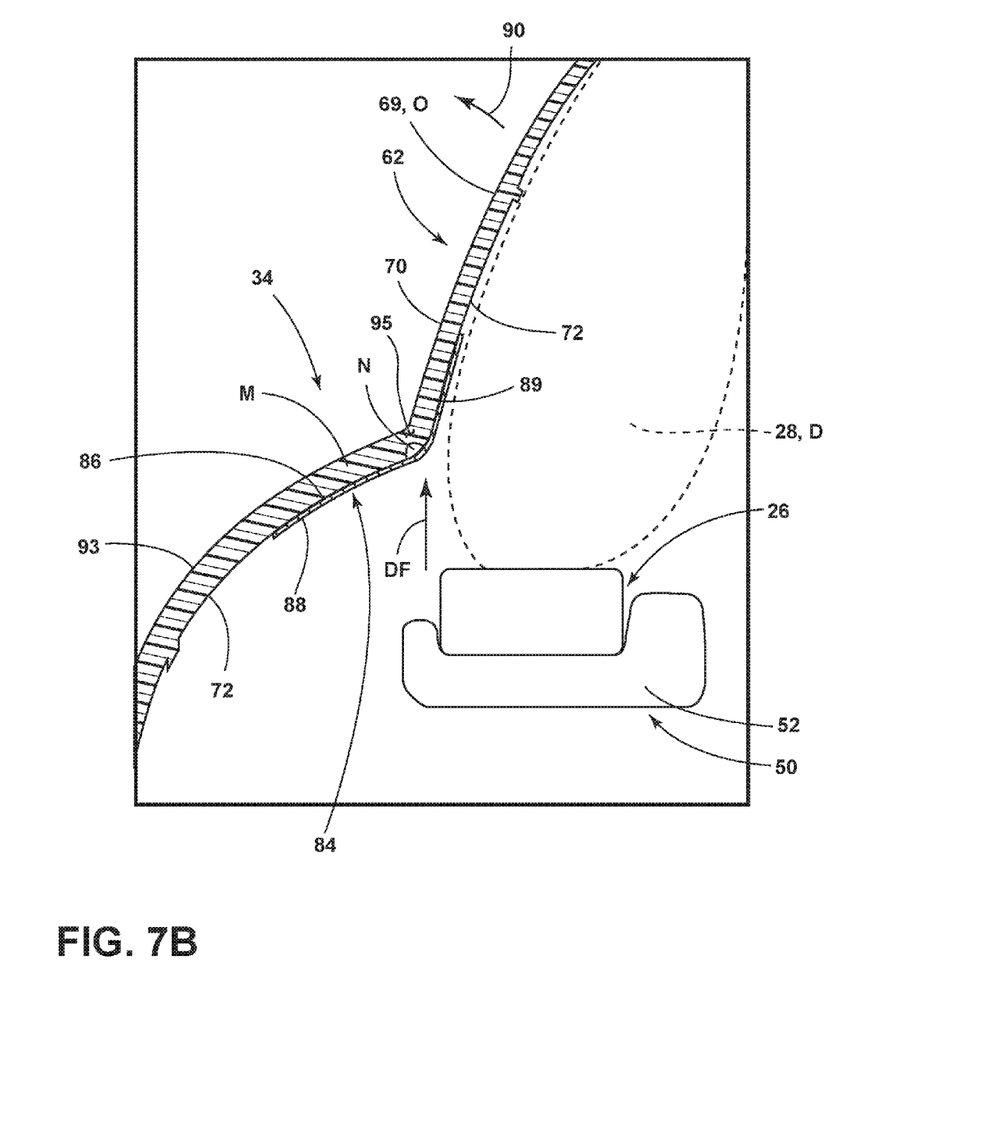
FIG. 7B is a cross-sectional view of the pack panel of FIG. 7A showing an airbag deployed in dashed lines.

Referring now to FIG. 7B, the airbag 28 is shown in a deployed position D from the airbag module 26 coupled to the first side member 52 of the seatback frame 50. As the airbag 28 deploys, the airbag 28 contacts the inner surface 72 of the first side member 62 of the back panel 34 with an outwardly directed deployment energy or force sufficient to break or release at least a portion of the interconnection between the seatback carrier 32 and the back panel 34. The interconnection between the seatback carrier 32 and the back panel 34 is partially defined by the connection of clips 92 disposed along the first and second side members 62, 64 of the back panel 34 and the clip mounting features 94 disposed on the attachment flanges 46, 48 of the seatback carrier 32. As this interconnection is disrupted or released, the front portion 69 of the side member 62 will move outward in the direction as indicated by arrow 90 pivoting from the notch N under the power of the deployment of the airbag 28. Thus, the notch N is strategically placed along the inner surface 72 of the first side member 62 of the back panel 34 to provide a controlled flexing of the front portion 69 of the first side member 62 of the back panel 34. Thus, the airbag door AD is moved to the open position O with notch N acting as a living hinge connection between first side member 62 and the airbag door AD. Further, the adhesive patch 84, as coupled to the inner surface 72 of the first side member 62 at adhesive layer 86, provides for a controlled flex and tethering of the airbag door AD of the first side member 62. As specifically shown in FIG. 7B, the first side member 62 includes the front portion 69 and a rear portion 93 which are separated by and disposed on opposite side of the notch N disposed therebetween. The adhesive patch 84 is shown having a rear portion 88 coupled to the inner surface 72 along the rear portion 93 of the first side member 62. The adhesive patch 84 further includes a front portion 89 that is coupled to the inner surface 72 of the front portion 69 of the first side member 62. In this way, the adhesive patch 84 serves as a tether between the moveable airbag door AD and the substantially stationary rear portion 93 of the side member 62 of the back panel 34 during the deployment of the airbag 28.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A seatback assembly comprising:
a back panel having a first side member with an elongate notch disposed thereon, wherein an airbag door operable between open and closed positions is defined between the notch and a front portion of the first side member;
a seatback frame coupled to the back panel and having an airbag deployment system coupled thereto, wherein the airbag deployment system is configured to deploy an airbag in an outward direction towards the first side member of the back panel to move the airbag door from the closed position to the open position under a deployment force applied by the airbag; and
an adhesive patch adhered to an inner surface of the first side member of the back panel and substantially covering the notch.

2. The seatback assembly of claim 1, wherein the back panel further includes a second side member having a second notch disposed thereon.

3. The seatback assembly of claim 2, including:
a seatback carrier having first and second side members coupled to the first and second side members of the back panel.

4. The seatback assembly of claim 3, wherein the seatback carrier is coupled to the seatback frame, and the seatback frame is disposed between and covered by the seatback carrier and the back panel.

5. The seatback assembly of claim 4, including:
clips disposed on the first and second side members of one of the seatback carrier and the back panel to releasably couple the back panel to the seatback carrier at an interconnection therebetween.

6. The seatback assembly of claim 5, wherein the interconnection between the seatback carrier and the back panel releasably retains the airbag door in the closed position.

7. The seatback assembly of claim 6, wherein a portion of the interconnection between the seatback carrier and the back panel is released under the deployment force applied by the airbag during deployment of the airbag.

8. The seatback assembly of claim 1, wherein the notch defines a living hinge from which the airbag door pivots outwardly from the back panel to the open position.

9. The seatback assembly of claim 1, wherein the first side member of the back panel includes a body portion.

10. The seatback assembly of claim 9, wherein the notch provides for a thinned portion of the body portion disposed outwardly from the notch, the thinned portion defining a linear hinge from which the airbag door pivots outwardly from the back panel towards the open position.

11. The seatback assembly of claim 1, including:
a rear portion of the back panel disposed on an opposite side of the notch relative to the front portion of the back panel.

12. The seatback assembly of claim 11, wherein the adhesive patch includes a front portion adhered to the front portion of the first side member, and further wherein the adhesive patch includes a rear portion adhered to the rear portion of the first side member.

13. The seatback assembly of claim 1, wherein the adhesive patch tethers the airbag door to the back panel.

14. A seatback assembly, comprising:
a seatback frame having an airbag mounted thereto;
a back panel partially covering the seatback frame and having a notch separating a rear portion of the back panel from an airbag door configured to outwardly flex to an open position under an airbag deployment force; and
an adhesive patch disposed over a portion of the notch and adhered to both the rear portion and the airbag door of the back panel.

15. The seatback assembly of claim 14, wherein the adhesive patch tethers the airbag door to the rear portion of the back panel.

16. The seatback assembly of claim 15, wherein the notch is an elongate notch defining a thinned portion of the back panel disposed adjacent to the notch, the thinned portion providing a living hinge from which the airbag door pivots outwardly from the rear portion of the back panel towards the open position.

17. A seatback assembly, comprising:
a seatback frame having an airbag deployment system coupled to a side member thereof, the airbag deployment system having an airbag configured to deploy outwardly at a deployment force;
a back panel having a side member, wherein the side member at least partially covers the airbag deployment system, and further wherein the side member includes a notch disposed adjacent to the airbag deployment system and separating a rear portion of the back panel from an airbag door configured to outwardly flex to an open position under the deployment force of the airbag deployment system; and
an adhesive patch partially covering the notch and having an adhesive layer adhered to the rear portion of the back panel and the airbag door of the back panel.

18. The seatback assembly of claim 17, wherein the notch is an elongate notch having first and second ends disposed on a peripheral edge of the back panel.

19. The seatback assembly of claim 18, wherein the adhesive patch is an elongate patch having upper and lower ends, the lower end disposed above the peripheral edge of the back panel.

20. The seatback assembly of claim 19, wherein the notch defines a thinned portion of the back panel disposed adjacent to the notch, the thinned portion providing a living hinge from which the airbag door pivots outwardly relative to the rear portion of the back panel towards the open position.

\* \* \* \* \*